United States Patent
Suh et al.

(10) Patent No.: US 6,753,404 B2
(45) Date of Patent: Jun. 22, 2004

(54) CONTINUOUS PROCESS FOR THE PREPARATION OF COPOLYCARBONATE RESINS

(75) Inventors: Young Wook Suh, Daejeon (KR); Sung Hwan Cho, Daejeon (KR); Jae Hwan Lee, Daejeon (KR)

(73) Assignee: Samyang Corporation, Seoul (KR)

( * ) Notice: Subject to any disclaimer, the term of this patent is extended or adjusted under 35 U.S.C. 154(b) by 74 days.

(21) Appl. No.: 10/169,453

(22) PCT Filed: Dec. 21, 2000

(86) PCT No.: PCT/KR00/01503

§ 371 (c)(1),
(2), (4) Date: Jul. 1, 2002

(87) PCT Pub. No.: WO01/49772

PCT Pub. Date: Jul. 12, 2001

(65) Prior Publication Data

US 2003/0018159 A1 Jan. 23, 2003

(30) Foreign Application Priority Data

Dec. 31, 1999 (KR) ........................................ 1999-67767

(51) Int. Cl.[7] .............................................. C08G 64/00
(52) U.S. Cl. .................... 528/196; 264/176.1; 264/219; 422/131; 528/198
(58) Field of Search ....................... 422/131; 264/176.1, 264/211; 528/196, 198

(56) References Cited

U.S. PATENT DOCUMENTS

| | | |
|---|---|---|
| 3,030,331 A | 4/1962 | Goldberg |
| 3,169,121 A | 2/1965 | Goldberg |
| 3,207,814 A | 9/1965 | Goldberg |
| 3,220,976 A | 11/1965 | Goldberg |
| 4,059,565 A | 11/1977 | Yoshizaki et al. |
| 4,130,548 A | 12/1978 | Kochanowski |
| 4,286,083 A | 8/1981 | Kochanowski |
| 4,677,183 A | 6/1987 | Mark et al. |
| 4,774,315 A | 9/1988 | Miller |
| 4,788,275 A | 11/1988 | Miller |
| 5,025,081 A | 6/1991 | Fontana et al. |
| 5,286,834 A * | 2/1994 | Sakashita et al. ........... 528/198 |
| 5,321,114 A | 6/1994 | Fontana et al. |

OTHER PUBLICATIONS

Journal Of Polymer Science: polymer chemistry edition, vol. 18, pp. 75–90 (1980).
E.P. Goldberg, S.F. Strause and H.E. Munro, Polym. Prepr., 5. pp. 233–238 (1964).
Handbook Of Polycarbonate Science and Technology, pp. 80–83, Donald G. LeGrand and John T. Bendler, Marcel Drekker, Inc.

* cited by examiner

Primary Examiner—Terressa Boykin
(74) Attorney, Agent, or Firm—Anderson Kill & Olick; Eugene Lieberstein; Michael N. Meller

(57) ABSTRACT

A continuous process for the preparation of copolycarbonate resins has great advantages in preparing molding materials of intricate structure or of thin-wall: the molding process may be conducted easily at a relatively low temperature; the copolycarbonate has excellent impact strength especially at a low temperature; and they have excellent melt flow, i.e. 2 to 3 times of the conventional polycarbonates. The present invention is a new polycondensation process which is carried out sequentially by using serially connected tube-type reactors to simplify the process; and enhancing the rate of reaction for an incorporation of comonomer into the polymer backbone resulting from varying Reynols Number, Linear Viscosity and Weber Number.

15 Claims, 1 Drawing Sheet

CONTINUOUS PROCESS FOR THE PREPARATION OF COPOLYCARBONATE RESINS

FIELD OF THE INVENTION

The present invention relates to a continuous process for the preparation of copolycarbonate resins. More particularly, the present invention relates to a continuous process for the preparation of copolycarbonate resins having the following advantages, especially upon preparing molding materials of intricate structure and of thin-wall:

1) they can easily be processed at relatively low temperatures;
2) they have excellent impact strength, especially at low temperatures; and
3) they have excellent melt flow that is 2 to 3 times greater than that of the conventional polycarbonates.

BACKGROUND OF THE PRIOR ART

In general, aromatic polycarbonates possessing excellent mechanical and physical properties of tensile strength, dimensional stability, heat and impact resistance and optical clarity, have been widely used in numerous industries. However, in comparison with other polymers, the polycarbonates have a relatively higher melt viscosity during the manufacturing process leading to poor operations. There are also the difficulties in preparing intricate structures and thin-wall molding materials.

Many attempts to overcome the above problems have been continued until recently. Yet, it was not easy to retain all of the advantages of the conventional polycarbonates, and simultaneously to make lower the viscosity in a molten state.

One example of such attempts is the use of plasticizer for the very first time. Although fluidity of polycarbonate is generally enhanced when the plasticizer is used in conjunction with thermoplastic resins, use of the plasticizer induces brittleness and depreciation of the conventional physical properties of the thermoplastic resins.

Another examples are to use a molecular weight regulator, which is substituted phenol species containing a long aliphatic chain, or to prepare a low molecular weight polymer to improve the melt flow of the polymer. However, Notched Izod Impact Strength of the polymer is decreased and brittleness is induced in the polymer. Thus, the desired characteristics of the polymer may not be obtained.

Alternatively, application of bisphenol-A derivatives having a long aliphatic chain contributes to a significant increase in the melt flow. However, high costs of starting materials and low Notched Izod Impact Strength of the polymer are also another problems.

Meanwhile, the blending of the polycarbonates with other polymers results in improvement of their melt flow. But, another adverse effects on properties are obtained such as deterioration of clarity of the polycarbonates. Thus, the above method could not solve the existing problems.

Knowing that aforementioned problems have limitations, U.S. Pat. No. 3,169,121 (Goldberg et al.) discloses that a soft segment (molecules having a good mobility) with a long chain of an aliphatic ester derivative is incorporated into a part of polymer chain comprised of only a hard segment (molecules having a low mobility) i.e. bisphenol-A, which makes it possible to obtain copolycarbonate exhibiting a low glass transition temperature(Tg) and an improved melt flow. Additionally, it has been found that aliphatic diacid derivatives are preferred as aliphatic ester derivatives.

However, the above patent uses pyridine solvent and aliphatic diacid chloride, which is an aliphatic diester derivative with color. Thus, it brings about a problem with a color formation of the resulting product. Accordingly, the following problems still exist in the above patent: 1) Removal of pyridine solvent from the polymer during the preparation process; 2) color retention of the resulting product; 3) a high cost of aliphatic diacid chloride; and 4) mass supply of starting materials at the commercial level.

Accordingly, ongoing studies have been conducted to focus on the starting materials containing long aliphatic chains, while an interfacial process is used to solve the problems with the color retention and removal of the solvent, simultaneously. It has been found that an aliphatic diacid salt is a suitable material (comonomer) since its raw material is relatively easily available and it is also inexpensive. Kochanowski (U.S. Pat. No. 4,286,083) is one of the researchers who have used these materials and adopted the interfacial process for his experiment. In this patent, phosgenation reaction, in which two monomers (for example, bisphenol-A and aliphatic diacid derivative) exhibiting differences of reactivity are used, can be completed upon controlling a pH at two different stages. It discloses that polyester carbonate having low glass transition temperature (Tg) can be obtained.

Specifically, the phosgenation of aliphatic diacid and bisphenol-A at from pH 4.5 to 8, preferably from pH 5.5 to 6.5, is carried out to convert said aliphatic diacid into aliphatic diacid chloride, which is then reacted with bisphenol-A, the pH of the reaction is raised to a value of between 9 and 11.5 for the completion of the oligomerization and polycondensation reactions.

However, only 50% of adipic acid, which is used as an amount of 10 mole % of bisphenol-A (the principal monomer), is incorporated into the polymer backbone.

Even though the pH is controlled at two stepwise ranges for the completion of the reactions, unreacted reactants still remain in abundance. Moreover, a batch-type process for controlling the pH makes lessen the productivity of polycarbonates in the process, in comparison with a continuous-type process.

Other attempts have been made to improve Kochanowski's method in part. U.S. Pat. No. 4,677,183 discloses that a diacid salt rather than a diacid of a neutral state can improve the current rate of reaction. However, this method also uses the batch-type process, and a pH should be controlled at 2 stages in order to minimize any side reactions and increase the reaction rate.

On the other hand, other efforts, which include incorporation of aliphatic ester derivatives with long chains that act as a soft segment portion into polymer chains and simultaneously end-capping of the polymers using phenol derivatives substituted with paracumyl, isooctyl and isononyl, are made to obtain great improvements in physical properties of copolyestercarbonates (U.S. Pat. Nos. 4,774,315 and 4,788,275). However, these inventions have shortcomings that these also use the batch-type process and a pH should be controlled to two different stages for reacting reactants.

The above efforts result in partial improvements in polymers through modification of conventional polycarbonates exhibiting a high viscosity in its melting state upon processing. However, the problems such as simplification of the preparation process and increase of the reaction rate remain still unsolved. A novel polymerization process is required for simplification of the preparation process while inserting a co-monomer having different reactivity into the backbone of polymer.

In the prior art, a carbonate precursor (phosgene) should be introduced divisionally at two different pH ranges during the phosgenation process in order that monomers having different reactivity (i.e. bisphenol-A and aliphatic diacid salt derivative) are reacted with the carbonate precursor, which results in reducing unreacted reactants and improving melt flow of a conventional polycarbonate. For this process, only the batch-type process has been applicable. More specifically, cylindrically shaped reactors have been used to control a pH as multi-stages.

According to the prior art, a phosgene has been generally used 1.3 to 1.5 times more than total amounts of bisphenol-A and aliphatic diacid salt. Using a large amount of phosgen is not preferred to increase in a molecular weight of the polymer prepared from the oligomerization and polycondensation processes, since it produces a large amount of HCl to make lessen a pH of the reactor, and it also results in raising a production cost.

To solve these problems, the inventors have discovered a continuous preparation process for copolycarbonate, from which we have obtained a polycarbonate exhibiting a low melt viscosity than the commercial polycarbonates to mold an article more easily, and having excellent physical properties, and we can also obtain the polymer with high productivity and uniform quality. In particular, tube-type reactors are used to simplify the process (that is, cylindrically shaped batch-type reactor for reaction is generally used at two different ranges of pH, but in the present invention, serially connected two tube-type reactors are used for a continuous process), and variables such as Reynols Number, Linear Viscosity and Weber Number are regulated to increase the rate of reaction in order to achieve a novel polycondensation process involving an complete incorporation of comonomer into the polymer backbone.

SUMMARY OF THE INVENTION

A feature of the present invention is to provide a continuous process for preparing copolycarbonates suitable for molding articles of thin and complex structure due to their high melt flow.

Another feature of the present invention is to provide a continuous process for preparing copolycarbonate resins exhibiting an excellent transparency since unreacted reactants do not remain after the phosgenation reaction. In addition, the molding process of the copolycarbonate may be conducted at lower temperature (lower about 20° C.) than that of a conventional polycarbonate, so the present invention may lead to an improved molding process.

Another feature of the present invention is to provide a continuous process, which is conducted with serially connected two tube-type reactors, in which a pH is fixed independently at a constant value while the reactors are sequentially used, compared with a conventional batch-type process, which includes a pH control at multi-stages for the phosgenation reaction. Therefore, the present invention excels in productivity of copolycarbonate resins exhibiting uniformity in quality.

Further feature of the present invention is to provide a continuous process in which only small amounts of phosgene are required and the rate of reaction is increased without remaining any unreacted reactants for preparing copolycarbonate resins.

DETAILED DESCRIPTION OF THE INVENTION

Figure 1:
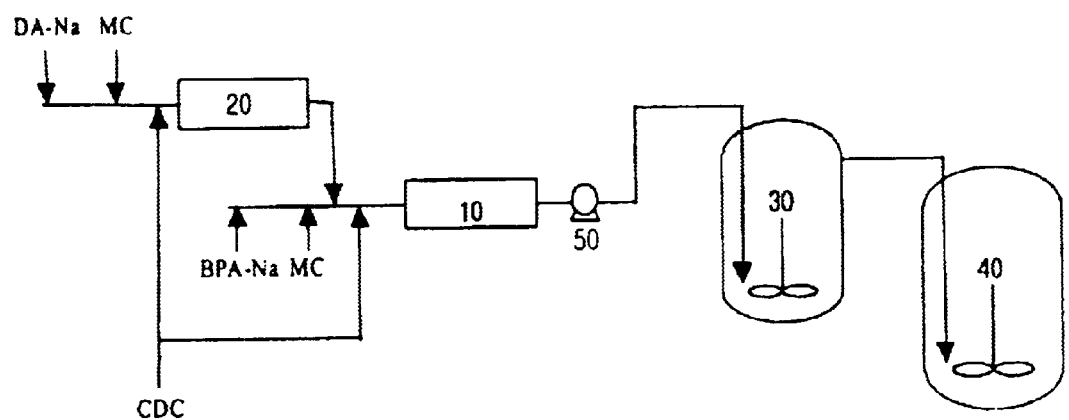
FIG. 1 shows a representative scheme of the process employed in the present invention, which comprises the first tube type reactor and the second tube type reactor for a continuous phosgenation reaction; and conventional cylindrically shaped reactors for oligomerization and polycondensation reactions.

The present invention relates to a continuous process for the preparation of copolycarbonate resins that prepared from a dihydric phenol salt, an aliphatic diacid derivative, a carbonate precursor and a molecular weight regulator, and the process uses serially connected two tube type reactors having inherent fixed pH to overcome different reactivity of monomers, and to maximize the productivity of the polycarbonates.

One preferred embodiment of the present invention is a continuous process for preparation of the copolycarbonate resins comprising the steps of:

(a) introducing an aliphatic diacid salt and a carbonate precursor to the second reactor with a lower pH than that of the first reactor for the first phosgenation reaction, which allows to convert said aliphatic diacid salt into an aliphatic diacid chloride, and sequentially introducing the resulting aliphatic diacid chloride with a carbonate precursor and a dihydric phenol salt to the first reactor for the second phosgenation reaction, wherein said first and said second reactors are tube-type reactors, and said two reactors are serially connected to conduct said reactions sequentially; (b) transferring the mixture prepared in step (a) to an oligomerization reactor, and then adding a molecular weight regulator and a catalyst for an oligomerization reaction; and (c) separating an organic layer from the resulting mixture prepared in step (b), and then introducing the organic layer to a polycondensation reactor, followed by adding an organic solvent and an alkaline aqueous solution to the organic layer for a polycondensation reaction.

Dihydric phenol salt of the present invention includes the materials derived from the compound represented by the formula:

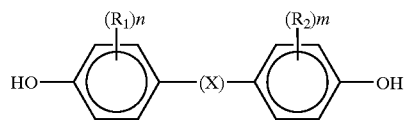

wherein

X may be an alkyl group, or it does not have any functional group, or have functional groups such as sulfide, ether, sulfoxide, sulfone, or ketone, or straight, branch, or cyclic alkyl group;

$R_1$ and $R_2$ independently represent hydrogen, halogen atom, straight alkyl group, branched alkyl group or cyclic alkyl group; and n and m independently represent an integer from 0 to 4.

It is preferable that X has straight, branched or cyclic alkyl groups containing from 1 to 10 carbon atoms.

The suitable examples of dihydric phenols are as follows:
bis(4-hydroxyphenyl)methane, bis(4-hydroxyphenyl) phenylmethane, bis(4-hydroxyphenyl) naphthylmethane, bis(4-hydroxyphenyl)-(4-isobutylphenyl)methane, 1,1-bis(4-hydroxyphenyl) ethane, 1-ethyl-1,1-bis(4-hydroxyphenyl)propane, 1-phenyl-1,1-bis(4-hydroxyphenyl)ethane, 1-naphthyl-1,1-bis(4-hydroxyphenyl)ethane, 1,2-bis(4- hydroxyphenyl)ethane, 1,10-bis(4-hydroxyphenyl) decane, 2-methyl-1,1-bis(4-hydroxyphenyl)propane, 2,2-bis(4-hydroxyphenyl)propane [also known as bisphenol-A], 2,2-bis(4-hydroxyphenyl)butane, 2,2-bis (4-hydroxyphenyl)pentane, 2,2-bis(4-hydroxyphenyl) hexane, 2,2-bis(4-hydroxyphenyl)nonane, 2,2-bis(3-methyl-4-hydroxyphenyl)propane, 2,2-bis(3-fluoro-4-hydroxyphenyl)propane, 4-methyl-2,2-bis(4-hydroxyphenyl)pentane, 4,4-bis(4-hydroxyphenyl) heptane, diphenyl-bis(4-hydroxyphenyl)methane, resorcinol, hydroquinone, 4,4'-dihydroxyphenyl ether [bis(4-hydroxyphenyl)ether], 4,4'-dihydroxy-2,5-dihydroxyphenyl ether, 4,4'-dihydroxy-3,3'-dichlorodiphenylether, bis(3,5-dimethyl-4-hydroxyphenyl)ether, bis(3,5-dichloro-4-hydroxyphenyl)ether, 1,4-dihydroxy-2,5-dichlorobenzene, 1,4-dihydroxy-3-methylbenzene, 4,4'-dihydroxydiphenol[p,p'-dihydroxyphenyl], 3,3'-dichloro-4,4'-dihydroxyphenyl, 1,1-bis(4-hydroxyphenyl)cyclohexane, 1,1-bis(3,5-dimethyl-4-hydroxyphenyl)cyclohexane, 1,1-bis(3,5-dichloro-4-hydroxyphenyl)cyclohexane, 1,1-bis(3,5-dimethyl-4-hydroxyphenyl)cyclododecane, 1,1-bis(4-hydroxyphenyl)cyclododecane, 1,1-bis(4-hydroxyphenyl)butane, 1,1-bis(4-hydroxyphenyl) decane, 1,4-bis(4-hydroxyphenyl)propane, 1,4-bis(4-hydroxyphenyl)butane, 1,4-bis(4-hydroxyphenyl) isobutane, 2,2-bis(4-hydroxyphenyl)butane, 2,2-bis(3-chloro-4-hydroxyphenyl)propane, bis(3,5-dimethyl-4-hydroxyphenyl)methane, bis(3,5-dichloro-4-hydroxyphenyl)methane, 2,2-bis(3,5-dimethyl-4-hydroxyphenyl)propane, 2,2-bis(3,5-dibromo-4-hydroxyphenyl)propane, 2,2-bis(3,5-dichloro-4-hydroxyphenyl)propane, 2,4-bis(4-hydroxyphenyl)-2-methyl-butane, 4,4'-thiodiphenol[bis(4-hydroxyphenyl)sulfone], bis(3,5-dimethyl-4-hydroxyphenyl)sulfone, bis(3-chloro-4-hydroxyphenyl)sulfone, bis(4-hydroxyphenyl)sulfide, bis(4-hydroxyphenyl)sulfoxide, bis(3-methyl-4-hydroxyphenyl)sulfide, bis(3,5-dimethyl-4-hydroxyphenyl)sulfide, bis(3,5-dibromo-4-hydroxyphenyl)sulfoxide, 4,4'-dihydroxybenzophenone, 3,3',5,5'-tetramethyl-4,4'-dihydroxybenzophenone, 4,4'-dihydroxy diphenyl, methylhydro quinone, 1,5-dihydroxynaphthalene, and 2,6-dihydroxynaphthalene.

Other dihydric phenols are described, for example, in U.S. Pat. Nos. 2,999,835; 3,028,365; 3,153,008; 3,334,154; and 4,131,575. Herein, dihydric phenols can be used alone or in combinations.

In addition, aliphatic diacid salt used as an essential monomer in the present invention may include any compounds derived from the formula:

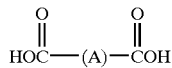

wherein A may be straight, branched, and cyclic aliphatic alkyl group having no functional group; straight, branched aliphatic structure having functional groups such as sulfide, ether, sulfoxide or sulfone. In order to prepare a polycarbonate with high melt flow, it is preferable that A is a straight aliphatic alkyl group containing from 6 to 20 carbon atoms.

Examples of a typical aliphatic diacid salt that may be used as essential co-monomers in the present invention are as follows:

malonic acid, methylmalonic acid, ethylmalonic acid, butylmalonic acid, dimethylmalonic acid, succinic acid, methylsuccinic acid, 2,2-dimethylsuccinic acid, 2-ethyl-2-methylsuccinic acid, 2,3-dimethylsuccinic acid, meso-2,3-dimethylsuccinic acid, glutaric acid, 2-methylglutaric acid, 3-methylglutaric acid, 2,2-dimethylglutaric acid, 2,4-dimethylglutaric acid, 3,3-dimethylglutaric acid, adipic acid, 3-methyladipic acid, 2,2,5,5-tetramethylhexanedioic acid, pimelic acid, suberic acid, azelaic acid, sebacic acid, undecanedioic acid, dodecanedioic acid, 1,11-undecanedioic acid, tetradecanedioic acid, pentadecanedioic acid, hexadecanedioic acid, octadecanedioic acid, nonadecanedioic acid, eicosanoic acid, decanoic acid, heneiconic acid and tetraconic acid.

Furthermore, branched and cyclic saturated or unsaturated aliphatic diacid salts and mixtures thereof may be used in the present invention. When a short-chain aliphatic diacid salt is used more than a dihydric phenol salt in a polymer, it has some difficulties in preparing copolycarbonates with desirable physical properties. Accordingly, an aliphatic diacid salt having at least 6 carbon atoms is preferred. The most preferable aliphatic diacid salts is sebacic acid or dodecanedioic acid upon considering their cost and physical properties.

The input amount of the aliphatic diacid salt is determined by considering the melt flow and the physical properties of a resulting product. Typically, it is preferable from 3 to 30 mole % based on dihydric phenol salt. The amount of the aliphatic diacid salt may vary with respect to its chain length, and its physical properties may vary by the input amount. If the input amount is less than 3 mole %, high melt flow of copolycarbonate cannot be obtained, and if the input amount is greater than 30 mole %, standard mechanical properties of copolycarbonate cannot be obtained. Thus, input amount of the aliphatic diacid salt is preferred to 5 to 20 mole %.

The suitable carbonate precursors of the present invention include carbonyl chloride, carbonyl bromide, bishaloformate, diphenyl carbonate or dimethyl carbonate and mixtures thereof. Phosgene (carbonyl chloride) commonly used in the interfacial and solution polymerization processes is most preferable as the carbonate precursor.

The molecular weight regulator useful in the present invention may be typically monofunctional phenolic compound. Examples of the molecular weight regulators include p-isopropyl phenol, p-tert-butyl phenol, p-cumyl phenol, p-isooctyl phenol and p-isononyl phenol, all of which are phenol derivatives. Furthermore, various kinds of substances including aliphatic alcohols may also be used. It is preferred that the amount of the molecular weight regulator to be used is from 1 to 5 mole %, preferably froth 2 to 4 mole % based on dihydric phenol salt.

The catalyst of the present invention includes amines. Tertiary alkyl amines are widely used as a catalyst and triethylamine is a typical example among them. Tetraethylammonium chloride, a halogen salt of quaternary ammonium, and amidine or guanidine may also be employed as the catalyst. The amount of catalysts to be used is from 0.25 to 5 mole %, preferably 0.5 to 2.5 mole % based on dihydric phenol salt.

Generally, the phosgenation reaction for preparing a homopolycarbonate from one kind of monomer is carried out under a constant pH in one step. Furthermore, the phosgenation reaction can be also carried out under a constant pH in one step when a branched polycarbonate is prepared from two different monomers (for example, bisphenol-A and 1,1,1-tris(4-hydroxylphenyl)ethane) having identical functional groups(hydroxyl groups) through the reaction.

However, the phosgenation reaction must be carried out at two different ranges of pH in order that the branched polycarbonate is prepared from monomers (for example, bisphenol-A and trimellitic acid), which do not have identical functional groups.

Since the monomers (for example, bisphenol-A and dicarboxylic acid) employed in the present invention have functional groups (for example, hydroxyl groups, ester groups) of different reactivity, it is difficult to complete the reaction without having any unreacted reactants with one step at a constant pH. Accordingly, the phosgenation reaction is completed under two reactors, each of which has a constant pH range.

According to the present invention, the first phosgenation reaction is carried out in a second tube type reactor at lower pH range than that of the first tube type reactor since the reactivity of aliphatic diacid salt with a carbonate precursor is relatively lower than that of dihydric phenol salt.

It is preferred that the pH range in the second tube type reactor is from pH 7.0 to 9.0, more preferably from pH 7.5 to 8.5. Aliphatic diacid salt is first reacted with a carbonate precursor such that aliphatic diacid salt is converted into aliphatic diacid chloride, followed by adding a carbonate precursor and the main monomer, i.e. dihydric phenol salt for the second phosgenation reaction, in the first tube type reactor at a pH range of from 9.5 to 13, preferably from 10.5 to 12.5.

If the residence time (or retention time) of the reactants within the first tube type reactor is too long, anhydrides are produced so much that it results in poor physical properties of the polycarbonate product. Thus, it is critical to regulate the residence time. But, some anhydride produced may react with a carbonate precursor to convert into carbonyl chloride in the first tube type reactor. Therefore, side reactions can be completely eliminated in the present invention. Such reaction is disclosed in U.S. Pat. No. 3,318,950.

Optionally, amine catalysts may be used to accelerate the reaction of diacid salt in the second tube type reactor.

According to the present invention, the melt flow of a copolycarbonate may be increased twice as much as that of the conventional polycarbonates having the same molecular weight by incorporating irregularly an aliphatic diacid salt having from 8 to 20 carbon atoms into a backbone of polycarbonate comprising bisphenol-A.

After the phosgenation reaction, an oligomerization reaction and a polycondensation reaction are sequentially carried out in the conventional cylindrically shaped reactors. Herein, the numbers of reactor may be determined, as desired. However, it is preferred to use of several reactors for productivity and uniformity in quality.

In reference to the drawings, FIG. 1 represents a process using the first and second tube type reactors for a phosgenation reaction, and conventional cylindrically shaped reactors for an oligomerization reaction and a polycondensation reaction. According to the present invention, copolycarbonate is prepared through this 3 steps (i.e. phosgenation, oligomerization, and polycondensation) process in which a pH control at the phosgenation step is simplified in comparison with the current batch type reaction system and the quality of a product may be maintained on a regular basis by means of the continuous process.

The following description of the present invention is taken in conjunction with FIG. 1.

In the present invention, two tube type reactors, each of which has a constant diameter and tube length, are employed. In the second tube type reactor(20) of FIG. 1, the conversion rate of aliphatic diacid salt to aliphatic diacid chloride reaches to its maximum value, and a carbonate precursor, e.g. phosgene, is used with its minimum amount, followed by carrying out the phosgenation reaction to complete in a main tube type reactor, namely first tube type reactor(10), therefore the productivity and uniformity in the quality of the product are maximized.

In FIG. 1, sebacic acid salt(SCA-Na) as an aliphatic diacid salt(DA-Na) and methylene chloride(MC) as an organic solvent are introduced into the second tube type reactor having an inside diameter of 3.5 mm and a tube length of 8 m, and phosgene(CDC) as a carbonate precursor is simultaneously introduced at a rate of 0.5 to 2.0 kg/h, preferably from 1.0 to 1.5 kg/h thereto. During the procedure, it is preferred that a pH within the second tube type reactor is maintained from 7.0 to 9.0.

Reynols number of the second tube type reactor(20) is from 20,000 to 50,000, preferably from 30,000 to 45,000; and Weber number thereof is from 25,000 to 40,000, preferably from 30,000 to 38,000. In addition, the flow rate of the reactant is from 1 to 3 m/s, preferably from 1.5 to 2.5 m/s. Residence time of reactants in the second tube type reactor(20) is from 5 to 10 seconds, preferably from 6 to 8 seconds.

As a result of passing through the second tube type reactor, most of the aliphatic diacid salt is converted into aliphatic diacid chloride. Although a partial (one-sided) conversion of aliphatic diacid salts occurs, it only contributes to less than 5 to 10% of the total amount of aliphatic diacid salt.

In order to accelerate the reaction of the aliphatic diacid salt and phosgene, the aforementioned tertiary amines or quaternary amines may be optionally added as a catalyst.

Following the process, bisphenol-A salt(BPA-Na) as a dihydric phenol salt and methylene chloride(MC) as an organic solvent are then introduced into the first tube type reactor(10) having an inside diameter of 15 mm and a tube length of 30 m, and the resulting diacid chloride from the second tube type reactor(20) is simultaneously introduced therein, and then a carbonate precursor, phosgene is introduced at a rate of the reactant 5 to 20 kg/h, preferably from 10 to 15 kg/h thereto. During the procedure, it is preferred that a pH within the first tube type reactor is maintained from 9.5 to 13.

Reynols number of the first tube type reactor(10) is from 40,000 to 80,000, preferably from 50,000 to 70,000; and Weber number thereof is from 30,000 to 50,000, preferably from 35,000 to 45,000. In addition, the flow rate of the reactant is from 3 to 6 m/s, preferably from 3.5 to 5 m/s. Residence time of reactants in the first tube type reactor(10) is from 8 to 20 seconds, preferably from 10 to 17 seconds With respect to the first tube type reactor(10) of the present invention, a heat exchanger is employed to maintain the temperature of the mixture that have undergone phosgenation reaction at 25 to 30° C. At this juncture, the molecular weight of the resulting product from the phosgenation reaction is from 500 to 2,000, preferably from 1,000 to 1,500. The results of analyzing the mixture by using a liquid chromatography indicate that there are no traces of unreacted reactants and by-products. In the conventional batch type reactor, unreacted reactants remain despite of controlling the pH of the reaction medium at two different ranges. As a result, reuse of unreacted reactants has been a problem in the conventional process.

The resulting mixture prepared in the phosgenation reaction is transferred to a conventional reactor(30) for oligomerization reaction by means of a pump(50). Then, in accordance with the desired final molecular weight, p-tert-butyl phenol as a molecular weight regulator is introduced into the reactor in a suitable amount (on the basis of dihydric phenol salt). A catalyst, for example, triethylamine(TEA) is also introduced thereto such that the molecular weight ranges from 2,000 to 5,000, preferably from 3,000 to 4,000.

After the oligomerization reaction, the mixture is separated into an organic layer and an aqueous layer. The organic layer is then introduced into a conventional polycondensation reactor(40) and is diluted with an organic solvent to be its concentration from 10 to 15% by weight, preferably from 10 to 13% by weight. Sodium hydroxide(NaOH) solution (40% by weight) is added therein to maintain pH of the reaction medium from 10 to 14, preferably from 12 to 13, and then allows the ratio of the aqueous phase(volume of the aqueous phase/the total volume of the mixture) to be from 15 to 30%, preferably from 20 to 25%.

Although one reactor may be used during a polycondensation reaction, it is also possible to employ several reactors in series. Catalysts for polycondensation reaction are incorporated at several steps since a degree of polycondensation is determined based on the amount of the catalysts. In order to react sufficiently while successively carrying out the entire reaction, it is preferable to use the catalysts at 2 or more steps in the present invention. The conditions of the polycondensation reaction and the use of the catalyst are well known to the skilled in the art.

After the polycondensation reaction, the resulting mixture is alkaline washed with methylene chloride and distilled water, and then leave it to make a phase-separation. After the phase-separation, an organic phase is isolated and then is washed with 0.1N hydrochloric acid and extracted with distilled water three times, sequentially. An aqueous phase remained after isolating the organic phase is analyzed with a liquid chromatography to detect unreacted reactants therein. The results indicate that the reaction is carried out completely such that no trace of unreacted diacid in the aqueous layer is detected.

After the washing is completed, the concentration of the organic phase containing copolycarbonate is kept constant such that a granulation takes place at a temperature of from 40 to 60° C., preferably from 45 to 55° C. Upon completing the granulation, the copolycarbonate is dried at 100° C. for 10 hours, at 110° C. for 5 hours and at 120° C. for 2 hours, consecutively. After drying, the polycarbonate is analyzed. Measurements by means of NMR, Thermal Analysis(Tg), Melt Flow Index(MFI), viscosity average molecular weight (Mv) and the remaining amount of oligomers indicate that the reaction is carried out completely. MFI of the copolycarbonate is 2 or 3 times that of the conventional polycarbonate with the same molecular weight, and the processing temperature of the copolycarbonate is about 20° C. lower than that of the conventional polycarbonate.

The following examples illustrate the invention but are not intended to limit the scope of the invention or claims thereof.

EXAMPLE 1

Sebacic acid salt(SCA-Na: a solution prepared by dissolving 7 kg of sebacic acid in 42.5 liters of 6% (w/w) NaOH aqueous solution) as a starting material and methylene chloride(MC) as an organic solvent were introduced into the second tube-type reactor(20) having an inside diameter of 3.5 mm and a tube length of 8 m, and phosgene was simultaneously introduced thereto at a rate of 1.2 kg/h. The reaction medium was maintained at pH 8.2.

After passing through the second tube type reactor, most of SCA-Na was converted into SCA-Cl. Although a partial (one-sided) conversion to aliphatic diacid chloride is also occurred, it only contributed to less than 5% of the total amount of aliphatic diacid salt introduced into the reactor.

Next, bisphenol-A salt(BPA-Na: a solution prepared by dissolving 75 kg of bisphenol-A in 42.5 liters of 6% (w/w) NaOH aqueous solution) and MC were introduced into the first tube type reactor(10) having an inside diameter of 15 mm and a tube length of 30 m, and phosgene was simultaneously introduced thereto at a rate of 12.8 kg/h. The reaction medium in the first tube-type reactor(10) is maintained at pH 12.1.

A heat exchanger was employed to maintain the temperature of the mixture that have undergone phosgenation reaction at 25 to 30° C. in the first tube-type reactor(10). At this juncture, the molecular weight of the resulting product was about 1,500.

The mixture prepared from the phosgenation reaction was transferred to an oligomerization reactor(30) by means of a pump(50). Then, 3 mole % of p-tert-butyl phenol(based on the dihydric phenol salt) and triethylamine(TEA) as a catalyst were introduced into the reactor such that the molecular weight of the product was adjusted to about 3,000.

Upon completing the oligomerization reaction, the mixture was separated into an organic layer and an aqueous layer. The organic layer was then introduced into a polycondensation reactor(40) and its concentration was maintained at 12% by weight by using an organic solvent. NaOH solution(40% by weight) was then added therein to maintain from pH 12 to 13, and then allowed the ratio of the aqueous phase (volume of the aqueous phase/the total volume of the mixture) to be 25%.

After the polycondensation reaction, the resulting mixture was alkaline washed with methylene chloride and distilled water, and then left it to make a phase-separation. After the phase-separation, an organic phase was isolated and then was washed with 0.1N hydrochloric acid and extracted with distilled water three times, sequentially. An aqueous phase remained after isolating the organic phase was analyzed by a liquid chromatography to detect unreacted reactants thereto. As a result, we have found that the reaction was carried out completely since unreacted diacid was not found in the aqueous phase.

After the washing step was completed, the concentration of organic phase containing the copolycarbonate was kept constant such that a granulation took place at a temperature of 48.5° C. Upon the completion of the granulation, the copolycarbonate was dried at 100° C. for 10 hours, at 110° C. for 5 hours, and at 120° C. for 2 hours.

The physical properties of copolycarbonate obtained from the aforementioned process were measured according to the following evaluated items. The results were shown in Table 1.

<Evaluated Items>

Unreacted reactants(%): measured with Liquid Chromatography HP 1100

Viscosity Average Molecular Weight: corrected to viscosity average molecular weight after measuring intrinsic viscosity in methylene chloride solvent (20° C.).

Melt Flow Index: measured by ASTM D-1238.

Glass Transition Temperature: measured by Perkin Elmer DSC 7.

Anhydrides: measured by Bruker Avance 400 NMR.

Thin-wall Molding: evaluated after injection molding for a housing (thickness: 0.6 mm) of portable communication device.

Low temperature impact resistance: measured by ASTM D-256.

EXAMPLE 2

Example 2 was carried out with the same procedure of Example 1 except that dodecanedioic acid salt(DDDA-Na: a solution made from 3.8 kg of dodecanedioic acid dissolved in 47 liters of 6% (w/w) NaOH aqueous solution) was used as an aliphatic diacid salt as shown in Table 1. Reaction time for phosgenation and pH in the first and the second tube type reactors were shown in Table 1. The results of analyzing unreacted reactants indicated that all monomers for giving the melt flow to a polymer had been incorporated into the backbone of the polymer. The results obtained by analyzing the physical properties of the resulting copolycarbonate were shown in Table 1.

EXAMPLES 3–8

Examples 3–8 were carried out with the same procedure of Example 1 except that the composition and the amount of aliphatic diacid salt were used as shown in Table 1. Reaction time for phosgenation and pH in the first and the second tube type reactors were shown in Table 1. The results of analyzing the physical properties of resulting copolycarbonate of the above process were shown in Table 1.

After the washing was completed, the concentration of the organic phase containing the copolycarbonate was kept constant such that a granulation took place at a temperature 48° C. as in Example 1. Upon the completion of the granulation, the copolycarbonate was dried at 100° C. for 10 hours, at 110° C. for 5 hours, and at 120° C. for 2 hours.

The physical properties of copolycarbonate obtained from the aforementioned process were shown in Table 2.

Comparative Example 2

Comparative Example 2 was carried out with the same reactants of Example 1 except that bisphenol-A, sebacic acid, phosgene and a molecular weight regulator, p-tert-butyl phenol, were reacted at pH 11.6 to carry out a phosgenation reaction, followed by oligomerization and polycondensation reactions under a constant pH as shown in Table 2. The results indicated that sebacic acid has hardly been incorporated into the backbone of a polymer. At high pH, bisphenol-A and phosgene were reacted well in comparison with a reaction between diacid salt and phosgene.

The physical properties of copolycarbonate obtained from Comparative Example 2 were shown in Table 2.

TABLE 1

| Example | 1 | 2 | 3 | 4 | 5 | 6 | 7 | 8 |
|---|---|---|---|---|---|---|---|---|
| Aliphatic diacid (mole %) | Sebacic Acid(10) | Dodecanedioic acid(10) | Sebacic acid(5) | Dodecanedioic acid(5) | Undecanedioic acid(10) | Tetramethyl hexanedioic acid(8) | Suberic acid(10) | Sebacic acid(15) |
| Reaction time of phosgenation (sec) | | | | | | | | |
| first tube type reactor | 17 | 17 | 15 | 16 | 18 | 17 | 15 | 20 |
| second tube type reactor | 7 | 7 | 5 | 6 | 7 | 8 | 6 | 10 |
| pH | | | | | | | | |
| first tube type reactor | 12.1 | 12.2 | 12.4 | 12.1 | 12.6 | 12.5 | 12.2 | 12.8 |
| second tube type reactor | 8.2 | 8.0 | 8.0 | 8.3 | 7.8 | 7.9 | 7.9 | 7.6 |
| Unreacted reactants (%) | 0 | 0 | 0 | 0 | 0 | 0 | 0 | 0 |
| Viscosity average molecular weight (Mv) | 24,500 | 25,200 | 21,100 | 22,500 | 25,600 | 21,500 | 25,000 | 22,800 |
| Melt Flow Index (MFI) | 31 | 29 | 22 | 24 | 33 | 22 | 17 | 45 |
| Glass transition temperature (Tg) | 129 | 124 | 137 | 135 | 124 | 134 | 132 | 122 |
| Anhydride | —[a] | — | — | — | —[a] | — | — | — |
| Thin-wall molding | E[b] | E | E | E | E[b] | E | E | E |
| Impact strength at low temperature | E | E | E | E | E | E | E | A[c] |

[a] not present, [b] excellent, [c] average

Comparative Example 1

Comparative Example 1 was carried out with the same reactants of Example 1 except that a conventional method, namely a batch type process for a phosgenation reaction is employed instead of using serially connected tube type reactors.

More specifically, after a phosgenation reaction was carried out at pH 6.4, and then raised to pH 11.2 for the completion of oligomerization and polycondensation reactions. Upon completing the polycondensation reaction, the mixture was alkaline washed with methylene chloride(MC) and distilled water and then left it to make a phase-separation. After the phase-separation, an organic phase was isolated and then was washed with 0.1N hydrochloric acid and extracted with distilled water three times, sequentially. An aqueous phase remained after isolating the organic phase was analyzed by a liquid chromatography to detect unreacted reactants thereto. As a result, about 9% of the unreacted reactants were detected from the aqueous phase.

Comparative Example 3

Comparative Example 3 was carried out with the same reactants of Example 1 except that bisphenol-A, sebacic acid, phosgene and a molecular weight regulator, p-tert-butyl phenol, were reacted at pH 7.2 to carry out a phosgenation reaction, followed by oligomerization and polycondensation reactions under a constant pH as shown in Table 2. Although the results indicated a significant incorporation of sebacic acid into the backbone of a polymer, bisphenol-A was hardly incorporated into the polymer due to a low pH of the reaction medium. Furthermore, since the molecular weight of the copolycarbonate did not increase, desired physical properties of the copolycarbonate was not obtained.

The physical properties of copolycarbonate obtained from the aforementioned process are shown in Table 2.

TABLE 2

| Comparative Example | 1 | 2 | 3 |
|---|---|---|---|
| Aliphatic diacid (mole %) | Sebacic acid (10) | Sebacic acid (10) | Sebacic acid (10) |
| Reaction time of phosgenation (sec) | 25 | 26 | 23 |
| pH | | | |
| Step 1 | 6.4 | 11.6 | 7.2 |
| Step 2 | 11.2 | 11.6 | 7.2 |
| Unreacted reactants (%) | 9 | 86 | 4 |
| Viscosity average Molecular weight (Mv) | 23,000 | 23,200 | 18,200 |
| Melt Flow Index (MFI) | 18 | 13 | 24 |
| Glass transition temperature (Tg) | 139 | 151 | 145 |
| Anhydride | Present | Present | Present |
| Thin-wall molding | Average | Poor | Poor |
| Impact strength at low Temperature | Poor | Poor | Poor |

In the present invention, two tube type reactors having constant inside diameter and tube length are used for a phosgenation reaction, from which aliphatic diacid salts as a monomer for enhancing melt flow of a resulting polymer allow to convert into aliphatic diacid chlorides maximally in the second tube type reactor, also a carbonate precursor (phosgene) is minimally utilized for the completion of a phosgenation reaction, finally the phosgenation reaction is completed in the first tube type reactor. By means of irregular (or random) incorporation of the monomers, copolycarbonate having 2 to 3 times melt flow than a conventional polycarbonate and physical properties similar to those of the conventional polycarbonate may be prepared.

In addition, the resulting copolycarbonate has excellent impact strength at a low temperature, so materials having complex structures and thin wall may be molded easily. The copolycarbonate resins are very useful in preparing housings for personal cellular phones, notebooks and desktop computers; and optical disks for voice, visual and information storages, films and optical fibers. In particular, the copolycarbonate of the present invention replaces with the commercial polycarbonates to solve the problem of double refraction.

What is claimed is:

1. A continuous process for the preparation of a copolycarbonate comprising the steps of:
   (a) carrying out a first and second phosgenation reaction in tandem with the first phosgenation reaction occurring in a second tube-type reactor into which an aliphatic diacid salt and a carbonate precursor is added under first pH reaction conditions to form an aliphatic diacid chloride and with the second phosgenation reaction occurring in a first tube-type reactor interconnected serially to the second reactor such that the resulting aliphatic diacid chloride from the first phosgenation reaction is passed in secquence to the first reactor for reaction with a carbonate precursor and a dihydric phenol salt under second pH conditions higher than the first pH reaction conditions in the second reactor to produce a reaction mixture;
   (b) transferring the reaction mixture prepared in step (a) to an oligomerization reactor, and then adding a molecular weight regulator and a catalyst for an oligomerization reaction, and
   (c) separating an organic layer from the resulting mixture prepared in the step (b), and then introducing the organic layer to a polycondensation reactor, followed by adding an organic solvent and an alkaline aqueous solution to the organic layer for a polycondensation reaction.

2. The process according to claim 1, wherein said aliphatic diacid salt is a derivative of a compound selected from the group consisting of 3-methyladipic acid, pimelic acid, suberic acid, azelaic acid, sebacic acid, 2,2,5,5-tetramethylhexanedioic acid, undecanedioic acid, dodecanedioic acid, and the mixtures thereof.

3. The process according to claim 1, wherein said aliphatic diacid salt is used from 3 to 30 mole % based on the dihydric phenol salt.

4. The process according to claim 1, wherein a pH of the reaction medium in said second tube type reactor is maintained from 7.0 to 9.0; and a pH of the reaction medium in said first tube type reactor is maintained from 9.5 to 13.

5. The process according to claim 1, wherein said carbonate precursor is introduced into the second tube type reactor at a rate of from 0.5 to 2.0 kg/h; and said carbonate precursor is introduced into the first tube type reactor at a rate of from 5 to 20 kg/h.

6. The process according to claim 1, wherein the flow rate of reactant in the second tube type reactor is from 1 to 3 m/sec; and the flow rate of reactant in the first tube type reactor is from 3 to 6 m/sec.

7. The process according to claim 1, wherein the residence time of the reactant in the second tube type reactor is from 5 to 10 seconds; and the residence time of the reactant in the first tube type reactor is from 8 to 20 seconds.

8. The process according to claim 1, wherein the temperature of the resulting mixture prepared in step (a) is maintained at 25 to 30° C.

9. The process according to claim 1, wherein said molecular weight regulator is a monohydric phenol, and the amount of said molecular weight regulator is from 1 to 5 mole % based on a dihydric phenol salt; and said catalyst is tertiary or quaternary amine, and the amount of said catalyst is from 0.25 to 5 mole % based on a dihydric phenol salt.

10. The process according to claim 9, wherein said molecular weight regulator is p-tert-butyl-phenol.

11. The process according to claim 9, wherein said catalyst is triethylamine.

12. The process according to claim 1, wherein the concentration of said organic layer is maintained from 10 to 15% by weight by adding said organic solvent during said polycondensation reaction; and a pH of said organic layer is maintained from 10 to 14 during polycondensation reaction by adding an alkaline aqueous solution, wherein said alkaline aqueous solution is a sodium hydroxide aqueous solution.

13. The process according to claim 1, wherein said dihydric phenol salt is bisphenol-A salt.

14. The process according to claim 1, wherein said carbonate precursor is selected from the group consisting of phosgene, carbonyl bromide, bis-haloformate, diphenyl carbonate or dimethyl carbonate, and mixtures thereof.

15. The process according to claim 1, wherein Reynols number is from 20,000 to 50,000 and Weber number is from 25,000 to 40,000 in the second tube type reactor; and Reynols number is from 40,000 to 80,000 and Weber number is from 30,000 to 50,000 in the first tube type reactor.

* * * * *